Jan. 28, 1947. E. S. WADDINGTON 2,415,052
ELECTRIC WELDING HEAD
Filed July 14, 1944 2 Sheets-Sheet 1
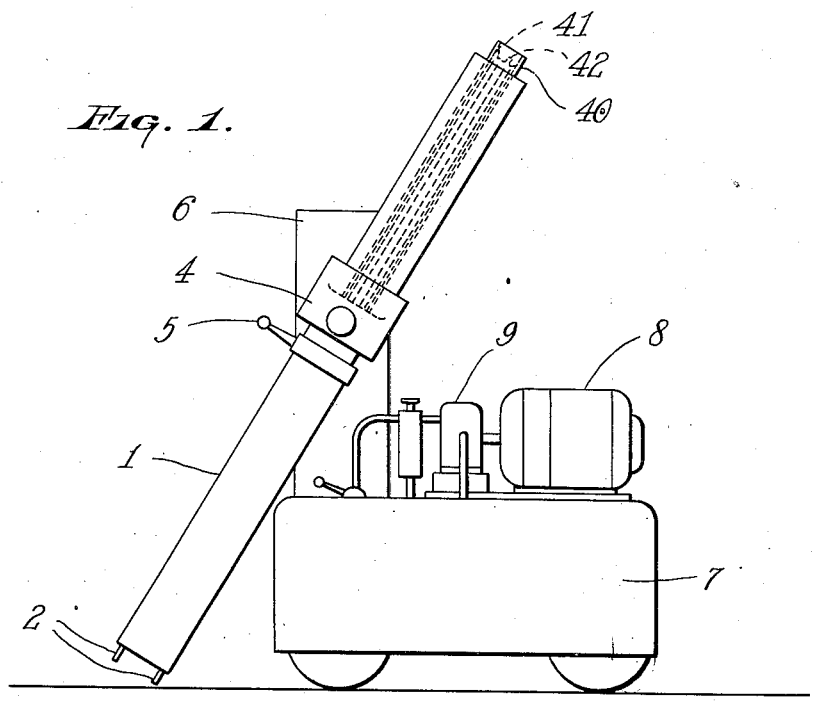
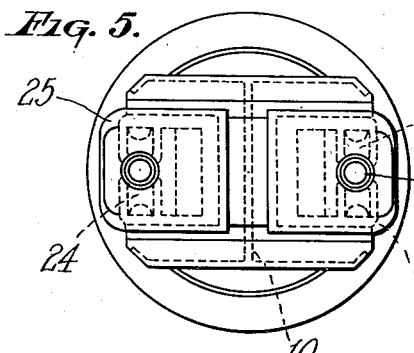
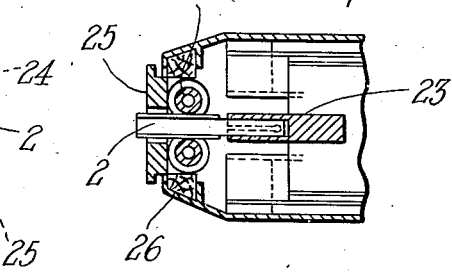
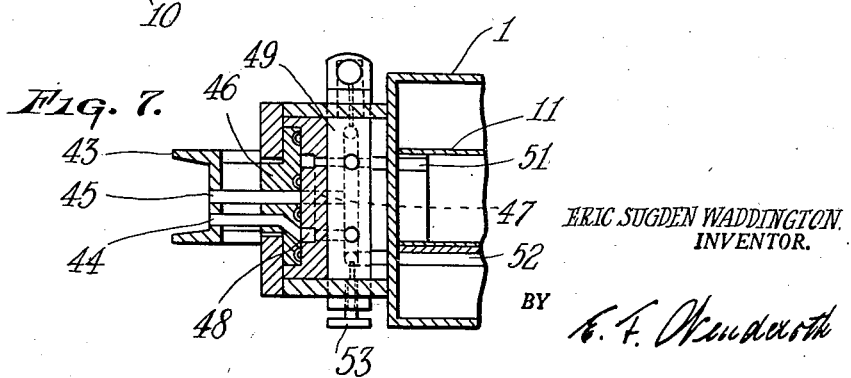
ERIC SUGDEN WADDINGTON
INVENTOR.
BY
ATTORNEY.

Jan. 28, 1947.     E. S. WADDINGTON     2,415,052
ELECTRIC WELDING HEAD
Filed July 14, 1944     2 Sheets—Sheet 2
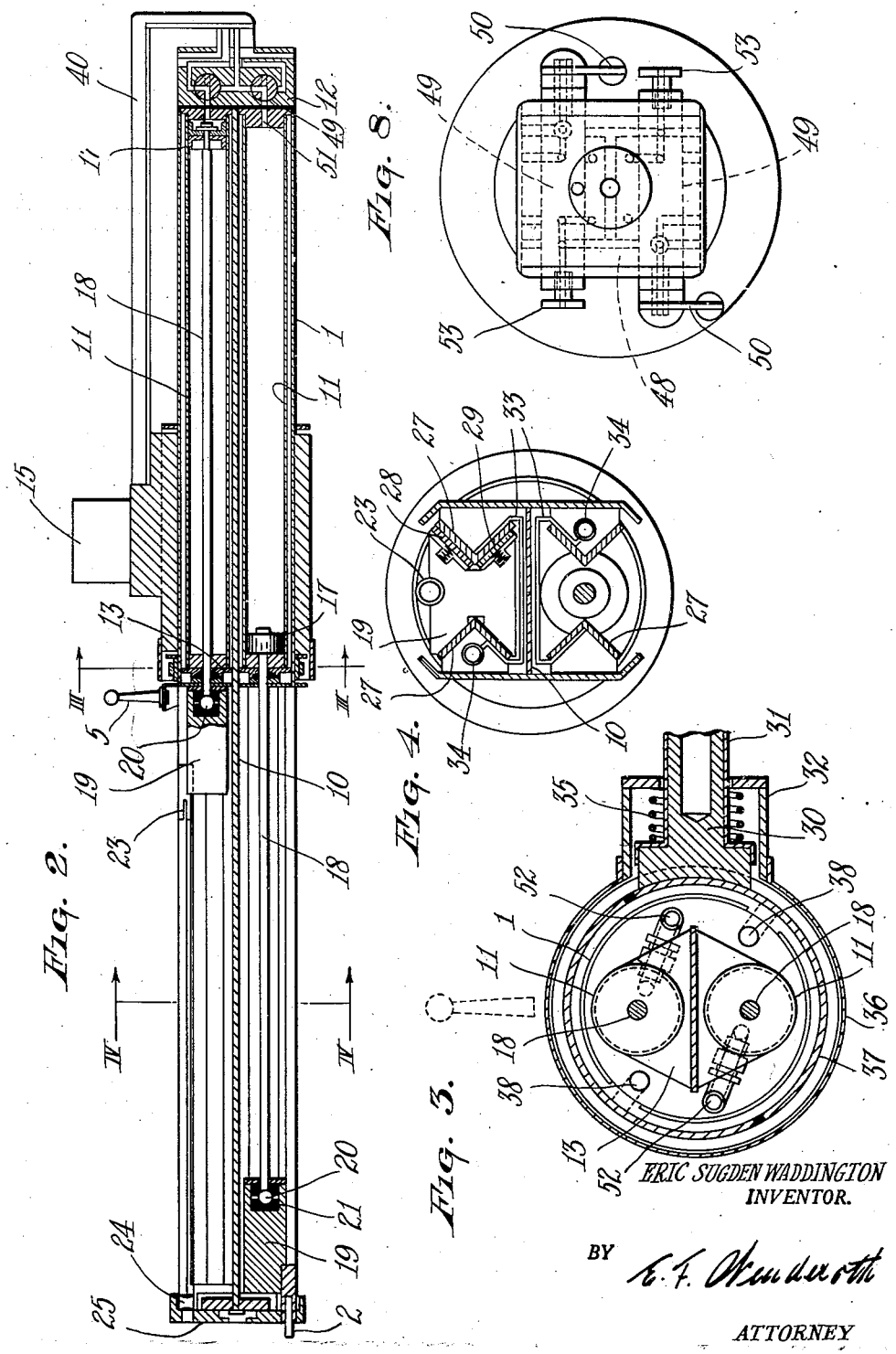
ERIC SUGDEN WADDINGTON
INVENTOR.
BY
ATTORNEY Patented Jan. 28, 1947

2,415,052

UNITED STATES PATENT OFFICE 2,415,052

ELECTRIC WELDING HEAD

Eric Sugden Waddington, London, England, assignor to The Hartford National Bank and Trust Company, Hartford, Conn., as trustee Application July 14, 1944, Serial No. 544,855
In Great Britain April 16, 1943

7 Claims. (Cl. 219—8)

Welding heads comprising a single welding unit necessitate a break in the welding period while the electrode is being replaced; to avoid this interruption in the welding operation use has been made of a continuous electrode but this involves the limitation to comparatively small gauges of wire which can conveniently be coiled on a drum or spool.

The primary object of the present invention is to minimise the interruption while avoiding the limitation as to the diameter which can be employed.

With this object in view, the welding head according to the invention is constructed as a rotor comprising two or more independent units so arranged that by rotation of the head any one unit can be located in the welding position and operated whilst the other unit or units is or are being loaded. Standard straight electrodes can be used and as no coiling is involved no corresponding limitation as to diameter need be imposed; the interruption in the operation of welding is reduced to the time required to rotate the head to present a fresh electrode to the working position the idle holder or holders being loaded during the welding operation with that electrode which is in the welding position.

In a convenient form of apparatus according to the present invention the welding head comprises two or more units arranged parallel to and in angularly offset positions in relation to the axis of rotation. Each unit preferably comprises metal guides of angular section in which slides a metal block which is precisely guided by the guides and to which the welding electrode is attached.

Adjacent the weld, the electrode may be guided and supported by a baffle plate which is adjustable or readily detachable so that it can be changed to suit various sizes of electrode. The baffle plate is associated with guide rollers of suitable material which reduce the friction of the electrode movement. The baffle plate is electrically insulated from the body of the unit and is also heat insulated and may be self cooled or provided with a separate cooling system such as air blast or water or other coolant.

The metal block carrying the electrode and the angular metal guides are electrically insulated from the body of the unit and electrically connected to a collector ring on the welding head to which welding current is supplied by means of a suitable brushgear. The collector ring is divided into segments so arranged that only the unit positioned on the welding seam receives current, the other unit or units being electrically disconnected. The metal block carrying the electrode is mechanically connected to and electrically insulated from the piston of a hydraulic cylinder provided with inlet and exhaust valves so that the piston will feed the electrode in the direction of the weld at any desired speed or return the electrode carrier to the starting position at a suitable high speed. The rate of feed is controlled by an adjustable valve or valves arranged to give volumetric control of the hydraulic fluid to the cylinder.

The complete welding head may be mounted in any one of a number of ways. It may be so mounted to give universal movement within a specified area on a fixed vertical column, or mounted on a suitably driven carriage which may be guided in such a manner as to provide a welding movement in any desired direction. By the provision of flexible cables it may be made a complete independent travelling unit with a self contained hydraulic pump to provide control of the necessary movements.

Reference will now be had to the accompanying drawings, in which:

Fig. 1 shows a side elevation of a mobile welding unit according to the invention, Fig. 2 is a longitudinal section through the welding head, Fig. 3 is a transverse section substantially along the line III—III of Fig. 2, Fig. 4 is a transverse section substantially along the line IV—IV of Fig. 2, Fig. 5 is an enlarged end view of the welding head, Fig. 6 is a corresponding fragmentary section showing the arrangement for guiding the welding rod, Fig. 7 is an enlarged longitudinal section, and Fig. 8 is an end view of the valve control system for the hydraulic cylinders.

Referring first to Fig. 1, the welding head 1 carries two welding electrodes 2 and is adapted to be turned about its longitudinal axis so that either electrode can be presented to the work. For this purpose the head 1 is carried in a sleeve bearing 4 and is provided with a handle 5 to facilitate the turning of the head 1 about its own axis. The sleeve 4 is mounted on a trunnion bearing on a column 6 forming part of a carriage 7. The carriage 7 carries a motor 8 and a hydraulic pump 9 which is driven by the motor 8 and supplies the pressure medium to hydraulic cylinders controlling the advance and retraction of the electrode holders in relation to the welding head 1. The motor 8 or the pump 9 may be utilised to drive the carriage 7 to move the welding head 1 over the work.

Referring now to Figs. 2 to 6, the welding head 1 is rotatable about its own axis within the sleeve bearing 4 and the latter has a trunnion 15 whereby it is pivotally supported on the column 6 (Fig. 1 not shown in Fig. 2). The head 1 comprises a pair of hydraulic cylinders 1 arranged on opposite sides of a main plate or backbone 10 extending substantially the full length of the head 1. Each cylinder 11 is associated with one of the electrodes 2, so that the electrodes can be controlled separately as required. At one end, the cylinders 11 are associated with a valve casting 12 housing the valve arrangements for the pressure medium, and at the other end they are closed by sealing plates 13. Each cylinder accommodates a piston 17 with associated piston rod 18 passing through a gland in the corresponding sealing plate 13. The free end of each piston rod 18 is connected by a ball joint 20 to an electrode holder 19 which is slidable parallel to the axis of the welding head 1 on V-guides 27 (Fig. 4). The holder 19 is insulated from the piston rod 18 by insulation 21 at the ball joint 20. The electrode 2 is secured to the holder 19 by means of a split sleeve 23 carried by the latter. In Fig. 2, the lower electrode holder 19 is in its fully advanced position with the electrode 2 practically consumed, whereas the upper electrode holder is in its fully retracted position, the loading position.

The free end of each welding rod 2 is guided by a pair of guide cylinders 24 (Figs. 2, 5 and 6). The end face of the welding head adjacent the guide cylinders is provided with baffle plates 25 and insulating supports 26. The cylinders 24, baffle plate 25, and support 26 associated with each electrode are preferably constructed as a detachable unit, so that a different unit (having a hole in the baffle plate and a spacing between the guide cylinders appropriate to the welding rod to be used) can be substituted when a welding rod of different size is required. If desired, the baffle plate may be provided with a separate cooling system, such as an air blast, or water or other coolant.

The electrode holders 19 are conveniently made as non-ferrous castings. On one side each holder 19 bears directly against a guide 27, whereas on the other side a pair of loose guide plates 28 is provided on the holder 19. These plates 28 are urged by springs 29 against the corresponding guide 27.

The electrical connection to the welding rod 2 is effected by way of the holder 19 and the guides 27. The guides 27 of each pair are connected together electrically by a copper strap 33, which is provided with a loop 34 to receive a connecting pin to which current is supplied. If desired, current could be supplied to both sets of guides, but in the arrangement illustrated provision is made for supplying welding current only to that set of guides which is in welding position (viz. the lower set, Fig. 2).

Current is supplied to a carbon brush 30 which has an insulating casing 31 and is spring urged within a housing 32 by a spring 35. The housing 32 is secured to a sleeve 36 surrounding and fixed to the lower end of the bearing 4. Due to the spring 35, the brush 30 is constantly held in contact with a split slip ring 37 carried by the welding head 1. This ring 37 is insulated from the head 1 and comprises two almost semi-cylindrical segments insulated from each other. Each of the segments is electrically connected to an insulated pin 38 which engages in the loop of the corresponding strap 33. In this way the segments of the slip ring 37 are connected to the respective electrode holders 19. It is apparent from Fig. 3 that when by means of the handle 5 the welding head 1 is rotated about its own axis, the co-operation of the brush 30 with the split slip ring 37 causes the electrode in welding position to be supplied with current. When employing a welding head having only two electrode holders, it is convenient to provide for a rocking motion of the lever between two end positions giving an angular displacement of 180°. If the magazine welding head included a greater number of electrode holders, a step by step rotary or indexing movement would be required.

When a loaded electrode holder has been presented to the working position, the pressure medium is admitted to the corresponding cylinder 11 at the appropriate speed to advance the electrode holder at a rate compensating for the consumption of the electrode during the progress of the work. The speed may be regulated in any convenient manner, e. g. by a needle valve, and the regulation may be automatic or manual. The arrangement shown in the accompanying drawings is manual and the control of the separate cylinders is wholly independent. This arrangement will now be described with reference to Figs. 1, 2, 7 and 8. The flow and return pipes for the pressure medium extend from the pump 9, through the column 6 and into the trunnion 15 which is hollow. Thence they pass through the channel 40 to the valve casting 12. The channel 40 and the pipes 41, 42 therein participate in movement about the trunnion 15 but not in the movement about the axis of the welding head 1. The pipes 41, 42 terminate in a plug member (not shown) which is received in a socket 43 provided with two pipes 44 and 45 which are thereby connected to 41 and 42 respectively. The pipes 44 and 45 are secured in a member 46 which is stationary in relation to the bearing 4. The member 46 is in face contact with the valve casting proper, which has a bore 47 on the axis of the welding head and a concentric annular channel 48. The pipe 44 communicates with 48 and the pipe 45 with 47. Thus a continuous connection for the flow and return is ensured irrespective of the movement of the welding head about its own axis. From the channel 48 bores extend to two cylindrical valves 49 each with a setting lever 50. In accordance with the setting of the valves 49 pressure medium can be admitted to the cylinders 11 either above or below the pistons 17 to urge the latter in the desired direction. Admission to and exhaust from above the pistons takes place through bores 51, whereas admission to and exhaust from below the pistons takes place through pipes 52 which extend parallel to the cylinders 11 within the welding head 1. The rate of flow of the pressure medium through each cylinder valve 49 is regulated by a needle valve 53 controlling the free aperture of the admission bore through the cylinder valve to the upper side of the piston. Thus the rate at which the welding electrode is advanced can be reduced as required, whereas the retraction of the electrode holder for re-loading takes place at the maximum available speed.

In the foregoing the invention has been described as applied to a semi-automatic welding head, but it will be appreciated that the head may be fully automatic in which the electrode feed is controlled by the arc conditions and with automatic striking of the arc. However, the arrangement as described provides a simple and robust device which enables the larger sizes of standard welding electrodes to be deposited in the minimum of time and without fatigue to the operator.

I claim:

1. A welding head for selectively placing an electrode in welding position, comprising a supporting member, a frame member mounted within said supporting member and rotatable about its longitudinal axis, a plurality of electrode holders mounted in said frame member for supporting said electrodes substantially parallel to the axis of the frame member, said holders being movable parallel to and in the direction of the longitudinal axis of the frame member, and means to move the electrode holders in the direction of the axis of said member.

2. An electric welding head for selectively placing one of a plurality of welding electrodes in welding position, comprising a base plate frame member, a plurality of electrode holders angularly arranged around the longitudinal axis of said frame member for positioning the welding electrodes substantially parallel to the longitudinal axis of said frame member, means to move said electrode holders in a direction substantially parallel to the longitudinal axis of the plate frame member, a cylindrical housing secured to and surrounding the said frame member at the central portion thereof, and a sleeve bearing member embracing the said housing, said housing being rotatable around the longitudinal axis of the frame member and within the sleeve bearing member to thereby rotate the electrode holders around the axis of the frame member and to selectively place the welding electrodes in welding position.

3. An electric welding head for selectively placing one of a plurality of welding electrodes in welding position, comprising a base plate frame member, a plurality of electrode holders angularly arranged around the longitudinal axis of said frame member for positioning the welding electrodes substantially parallel to the longitudinal axis of said frame member, means to move said electrode holders in a direction substantially parallel to the longitudinal axis of the plate frame member, a cylindrical housing secured to and surrounding the said frame member at the central portion thereof, a sleeve bearing member embracing the said housing, said housing being rotatable around the longitudinal axis of the frame member and within the sleeve bearing member to thereby rotate the electrode holders around the axis of the frame member and to selectively place the welding electrodes in welding position, and means to rotate the welding head at right angles to the axis thereof comprising a trunnion member secured to the sleeve bearing member at right angles to the axis thereof.

4. An electric welding head for selectively placing one of a plurality of welding electrodes in welding position, comprising a base plate frame member, a plurality of electrode holders angularly arranged around the longitudinal axis of said frame member for positioning the welding electrodes substantially parallel to the longitudinal axis of said frame member, means to move said electrode holders in a direction substantially parallel to the longitudinal axis of the plate frame member comprising hydraulic actuated piston rods movable in the direction of the axis of said frame member and coupled to the electrode holders, a cylindrical housing secured to and surrounding the said frame member at the central portion thereof, and a sleeve bearing member embracing the said housing, said housing being rotatable around the longitudinal axis of the frame member and within the sleeve bearing member to thereby rotate the electrode holders around the axis of the frame member and to selectively place the welding electrodes in welding position.

5. An electrical welding head for selectively placing one of a plurality of welding electrodes in welding position, comprising a base plate frame member, a plurality of electrode holders angularly arranged around the longitudinal axis of said frame member for positioning the welding electrodes substantially parallel to the longitudinal axis of said frame member, means to hydraulically move said electrode holders in a direction substantially parallel to the longitudinal axis of the plate frame member, said means comprising cylinders angularly arranged and secured to the said frame member in a longitudinal direction thereof and having their axis coextensive with the axis of the electrode holders, pistons in said cylinders, and piston rods movable in the direction of the axis of said frame member and interconnected to the electrode holders and pistons, means to supply a pressure medium to said cylinders, valve means to selectively apply said pressure medium to the cylinders, and means to regulate the pressure medium for advancing the electrode holders, a cylindrical housing secured to and surrounding the said frame member at the central portion thereof, a sleeve member embracing the said housing, a valve operating member affixed to said sleeve member and rigidly securing a control element of said valve means in fixed position relative to the said valve means, said housing being rotatable around the longitudinal axis of the frame member and within the sleeve member to thereby rotate the electrode holders around the axis of the frame member, to selectively place the electrodes in welding position and to control the operation of the valve admitting the pressure medium to the cylinders associated with the electrodes in welding position.

6. An electric welding head for selectively placing one of a plurality of welding electrodes in welding position, comprising a base plate frame member, a plurality of electrode holders angularly arranged around the longitudinal axis of said frame member for positioning the welding electrodes substantially parallel to the longitudinal axis of said frame member, means to move said electrode holders in a direction substantially parallel to the longitudinal axis of the plate frame member, a cylindrical housing secured to and surrounding the said frame member at the central portion thereof, a sleeve bearing member embracing the said housing, said housing being rotatable around the longitudinal axis of the frame member and within the sleeve bearing member to thereby rotate the electrode holders around the axis of the frame member and to selectively place the welding electrodes in welding position, means to rotate the welding head at right angles to the axis thereof comprising a hollow trunnion member secured to the sleeve bearing member opposite an opening therein and at right angles to the axis thereof, and means to supply welding current to the electrode holder in position for welding comprising an electrically conducting split ring section adjacent to the hollow trunnion member, secured to and insulated from the said frame member and electrically connected to the electrode holder, and a brush member positioned within the hollow trunnion member and in contact with said ring section for electrically connecting the split ring to a welding current supply source.

7. An electric welding head for selectively placing one of a plurality of welding electrodes in welding position, comprising a base plate frame member, a plurality of pairs of guide members mounted on said base plate each pair comprising V-shaped members having the apex of the angles spaced apart and parallel to and equidistant from the longitudinal axis of said frame member, a plurality of electrode holders having grooves on opposite faces thereof for engaging said guide members, said holders being angularly arranged around the longitudinal axis of said frame members and between pairs of guide members, means to move each of said electrode holders comprising hydraulic actuated piston rods movable in the direction of the axis of said frame member, means to couple said piston rods to said holders comprising an insulating ball element secured to the piston rod and engaging a socked in the holder, a cylindrical housing secured to and surrounding the said frame member at the central portion thereof, a sleeve member embracing the said housing, said housing being rotatable around the longitudinal axis of the frame member within the sleeve member to thereby rotate the electrode holders around the axis of the frame member and to selectively place the welding electrodes in welding position, means to rotate the welding head at right angles to the axis thereof comprising a hollow trunnion member secured to the sleeve member opposite an opening therein and at right angles to the axis thereof, means to supply welding current to the electrode holder in position for welding comprising an electrically conducting split ring section adjacent to the hollow trunnion member, secured to and insulated from the said frame member and electrically connected to the electrode holder, and a brush member positioned within the hollow trunnion member and in contact with said ring section for electrically connecting the split ring to a welding current supply source, and means to insulate the face of the said frame member from the welding head and current and guide the free end of the electrodes substantially parallel to the longitudinal axis of said frame member comprising guide cylinders to accommodate the welding electrodes, insulating supports to hold the cylinders in position, and a baffle plate detachably positioned in the end face of the frame member and embracing the insulating support.

ERIC SUGDEN WADDINGTON.